United States Patent
Billeci

(10) Patent No.: US 7,889,569 B2
(45) Date of Patent: *Feb. 15, 2011

(54) SYSTEM, METHOD AND STORAGE MEDIUM FOR CONTROLLING ASYNCHRONOUS UPDATES TO A REGISTER

(75) Inventor: Michael Billeci, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 476 days.

This patent is subject to a terminal disclaimer.

(21) Appl. No.: 12/105,816

(22) Filed: Apr. 18, 2008

(65) Prior Publication Data

US 2008/0189492 A1 Aug. 7, 2008

Related U.S. Application Data

(60) Continuation of application No. 11/625,408, filed on Jan. 22, 2007, now Pat. No. 7,380,077, and a division of application No. 10/820,521, filed on Apr. 8, 2004, now Pat. No. 7,225,305.

(51) Int. Cl.
*G11C 7/22* (2006.01)

(52) U.S. Cl. .................. 365/189.011; 711/155

(58) Field of Classification Search .......... 365/189.011; 711/155, 163
See application file for complete search history.

(56) References Cited

U.S. PATENT DOCUMENTS

| | | | |
|---|---|---|---|
| 3,905,024 A | 9/1975 | Boucek et al. | |
| 4,503,535 A * | 3/1985 | Budde et al. ............ | 714/47 |
| 5,802,359 A | 9/1998 | Webb et al. | |
| 7,313,639 B2 * | 12/2007 | Perego et al. .......... | 710/71 |
| 7,703,021 B1 * | 4/2010 | Flam ..................... | 715/741 |
| 7,747,154 B2 * | 6/2010 | Silverbrook .......... | 396/57 |
| 2003/0051122 A1 | 3/2003 | Sato | |
| 2005/0044328 A1 | 2/2005 | Ganfield et al. | |
| 2005/0289120 A9 | 12/2005 | Soulanille et al. | |

* cited by examiner

*Primary Examiner*—Hoai V Ho
*Assistant Examiner*—Fernando N Hidalgo
(74) *Attorney, Agent, or Firm*—Cantor Colburn LLP; John Campbell

(57) ABSTRACT

A system for controlling asynchronous updates to a register, the system including a generally accessible register that is asynchronously updateable by hardware and software. The system also includes protection logic that is in communication with the register. The protection logic includes circuitry to prevent a hardware update to the register from being overwritten by a software update.

1 Claim, 5 Drawing Sheets

SYSTEM, METHOD AND STORAGE MEDIUM FOR CONTROLLING ASYNCHRONOUS UPDATES TO A REGISTER

CROSS REFERENCE TO RELATED APPLICATION

This application is a continuation application of U.S. Ser. No. 11/625,408, filed Jan. 22, 2007, which is a divisional application of U.S. Ser. No. 10/820,521, filed Apr. 8, 2004, the contents of which are incorporated by reference herein in their entirety.

BACKGROUND OF THE INVENTION

The invention relates to controlling asynchronous updates to a register in a computer system and in particular, to protecting hardware asynchronous updates to a register that is simultaneously modifiable by software.

There are many structures within a computer system that can be read and written by both hardware and software. These structures generally exist for the purpose of exchanging information (e.g., status, interrupts) between hardware and software. Due to the asynchronous nature of these structures, special attention must be paid to how software updates are performed. A typical register will hold more than one independently updateable field. Hardware updates to each field are automatically independent, but software updates to each field may not be independent. For example, a software update to such a register may include performing a "read-write-modify" operation. This operation instructs the software to read the register. If, in the time between the read and the write, the hardware has asynchronously updated a field, the hardware update will be lost (overwritten) by the old (stale) value at the completion of the read-modify-write operation.

One approach to handling the problem of asynchronous updates is to break up the register on field boundaries into separately accessible registers. This approach requires more registers, which may not always be available in the hardware system. Another approach to handling the problem of asynchronous updates is to add locks to fields within the register. Software would then be responsible for setting and resetting locks before and after the software updates. This approach is not ideal because it requires additional software instructions to be executed for each software update to a register. The execution of the extra instructions may cause longer execution times. A third approach to handling the problem of asynchronous updates is to create special instructions and hardware for accessing these registers such that a field can be manipulated independently. A drawback of this approach is that special instructions must be written and accessed to perform data manipulation. A further approach is to attempt to place critical bits into registers that don't get a lot of read-modify-write traffic. This works to a point, but will still fail, just not as often. In addition, new software code (e.g., milli-code) is created on a frequent basis. Therefore, a register that is thought at one point in time to have low traffic, may not have low traffic at a later time. In addition to the drawbacks noted above, none of these approaches to handling the problem of asynchronous updates provides a system where registers are generally accessible by software, such that the software can perform a single operation to read, write and/or read-write-modify the register.

BRIEF SUMMARY OF THE INVENTION

Exemplary embodiments of the present invention include a system for controlling asynchronous updates to a storage location. The system includes a generally accessible register that is asynchronously updateable by hardware and software. The system also includes protection logic that is in communication with the register. The protection logic includes circuitry to prevent a hardware update to the register from being overwritten by a software update.

Additional exemplary embodiments of the present invention include a method for controlling asynchronous updates to a register. The method includes processing a software read instruction for a bit within the register. The value of the bit is stored in a last read field in response to processing the software read instruction. A software write request to the bit is received. The current value of the bit is compared to the last read field. The software write request is processed if the current value of the bit is equal to the last read field.

Further exemplary embodiments include a computer program product for controlling asynchronous updates to a register. The computer program product includes a storage medium readable by a processing circuit and storing instructions for execution by the processing circuit for performing a method that includes a method for controlling asynchronous updates to a register. The method includes processing a software read instruction for a bit within the register. The value of the bit is stored in a last read field in response to processing the software read instruction. A software write request to the bit is received. The current value of the bit is compared to the last read field. The software write request is processed if the current value of the bit is equal to the last read field.

BRIEF DESCRIPTION OF THE DRAWINGS

Referring now to the drawings wherein like elements are numbered alike in the several FIGURES.

DETAILED DESCRIPTION OF THE PREFERRED EMBODIMENTS

Exemplary embodiments of the present invention provide for protection of individual fields in an asynchronously updateable register that is generally accessible by software and updateable by hardware. Generally accessible refers to the fact that the register may be accessed by software as a single unit with typical read, write or read-modify-write instructions. Without this protection, hardware updates to bits within the register may be overwritten by software updates. The individual fields within the register are protected from being overwritten with stale data when a hardware update is made to a field of the register while a read-modify-write operation is pending. Hardware is added to the critical bits within the register. The additional hardware remembers the last value read by the software. Then, when the software attempts to modify the value in the bit, the hardware only allows the modification if it is clear that the software's value is not stale. That is, if the software has the most current value, the hardware allows the modification to the bit, otherwise the hardware prevents the software from modifying the bit. An advantage to this approach is that bits that are known to be critical are protected by hardware. This protection is not affected by the addition of new functions and/or redefinitions.

Figure 1:
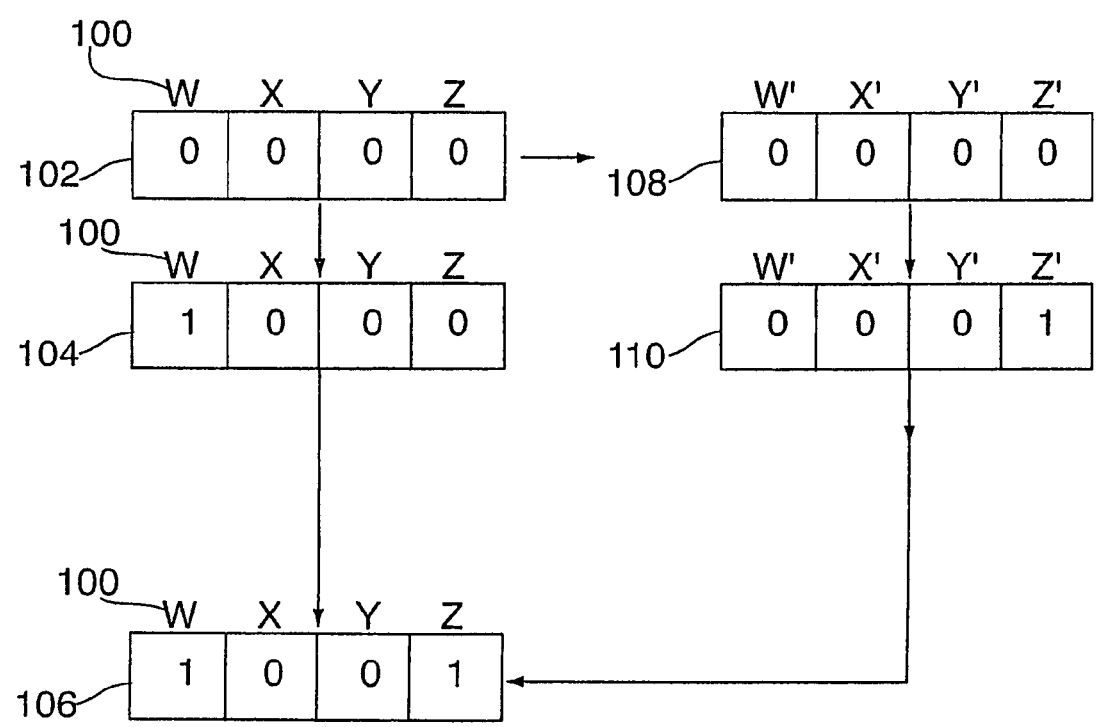
FIG. 1 is a block diagram of an asynchronous latch update process in a system where the hardware includes circuitry to set a latch.

FIG. 1 is a block diagram of an asynchronous latch update process in a system where the hardware includes circuitry to set a latch. FIG. 1 depicts the case where the hardware is setting a new value into a bit in a register 100 at the same time that the software is performing a read-modify-write to the register 100. Box 102 represents the register 100 with bit w=0, bit x=0, bit y=0 and bit z=0. The software performs a read-modify-write operation to bit z. First, the software reads the register 100 into box 108 including the values bit w'=0, bit x'=0, bit y'=0 and bit z'=0. The software performs its processing and updates field z' resulting in the data values included in box 110. Box 110 includes the values bit w'=0, x'=0, y'=0 and z'=1. Before the software attempts to write the data back into the register 100, the hardware has performed a set operation on bit w as shown in box 104. Box 104 depicts the values contained in the register 100 including bit w=1, bit x=0, bit y=0 and bit z=0. Now, if the software writes the contents of box 110 to the register 100, the update to bit w, performed by the hardware will be overwritten. This would result in the register 100 containing invalid data because the value of bit w read by the software is a stale value and does not contain the latest update made by the hardware. Exemplary embodiments of the present invention ensure that the hardware update to bit w is not overwritten by the value read by the software before the hardware update was performed (i.e., that box 106 includes both the hardware update to bit w and the software update to bit z). This results in valid data being contained in the register 100 as shown in box 106.

Figure 2:
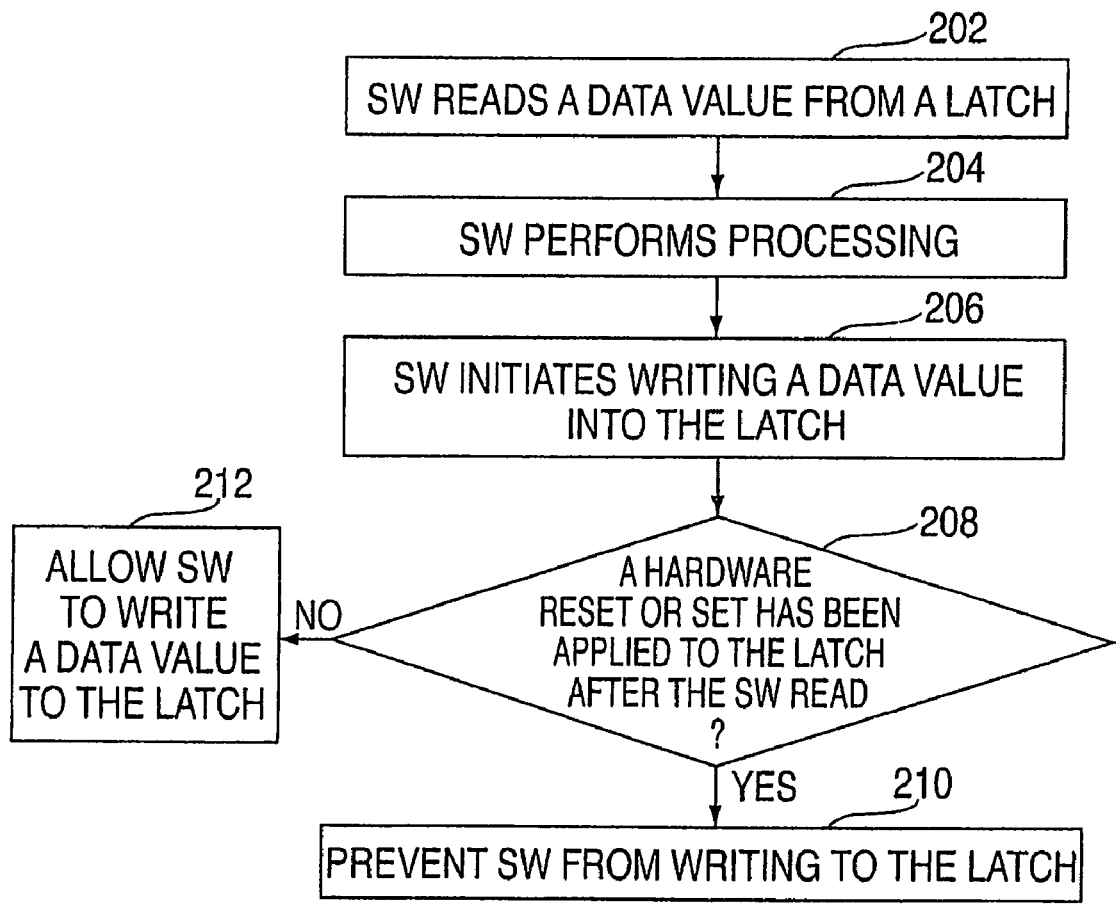
FIG. 2 is a flow diagram of a process utilized by an exemplary embodiment of the present invention to update the data value in an asynchronous latch in a system where the hardware includes circuitry to reset or to set the latch, and the software includes both latch update and latch read functions.

FIG. 2 is a flow diagram of a process utilized by an exemplary embodiment of the present invention to update the data value in an asynchronous latch in a system where the hardware includes circuitry to either reset the latch or to set the latch, and the software includes both latch update and latch read functions. The latch in this example includes protection logic to prevent a software update from overwriting a hardware reset or set operation. At step 202, software reads a data value from a latch that corresponds to a bit within a register 100. The software read is the first step in a read-modify-write operation. At step 204, the software performs processing which results in a modification to one or more of the bits in the register 100. Next, at step 206, the software initiates the writing of a data value into the latch. A check is made at step 208 to determine if a hardware reset or set was applied to the latch after the software read at step 202. If a hardware reset or set was applied to the latch after the software read, then step 210 is performed to prevent the software from writing to the latch and leaving the value of "1" in the latch if the hardware performed a set operation and a "0" if the hardware performed a reset operation. If it is determined at step 208, that a hardware reset or hardware set was not applied to the latch after the software read at step 202, then step 212 is performed and the software writes a data value to the latch.

Figure 3:
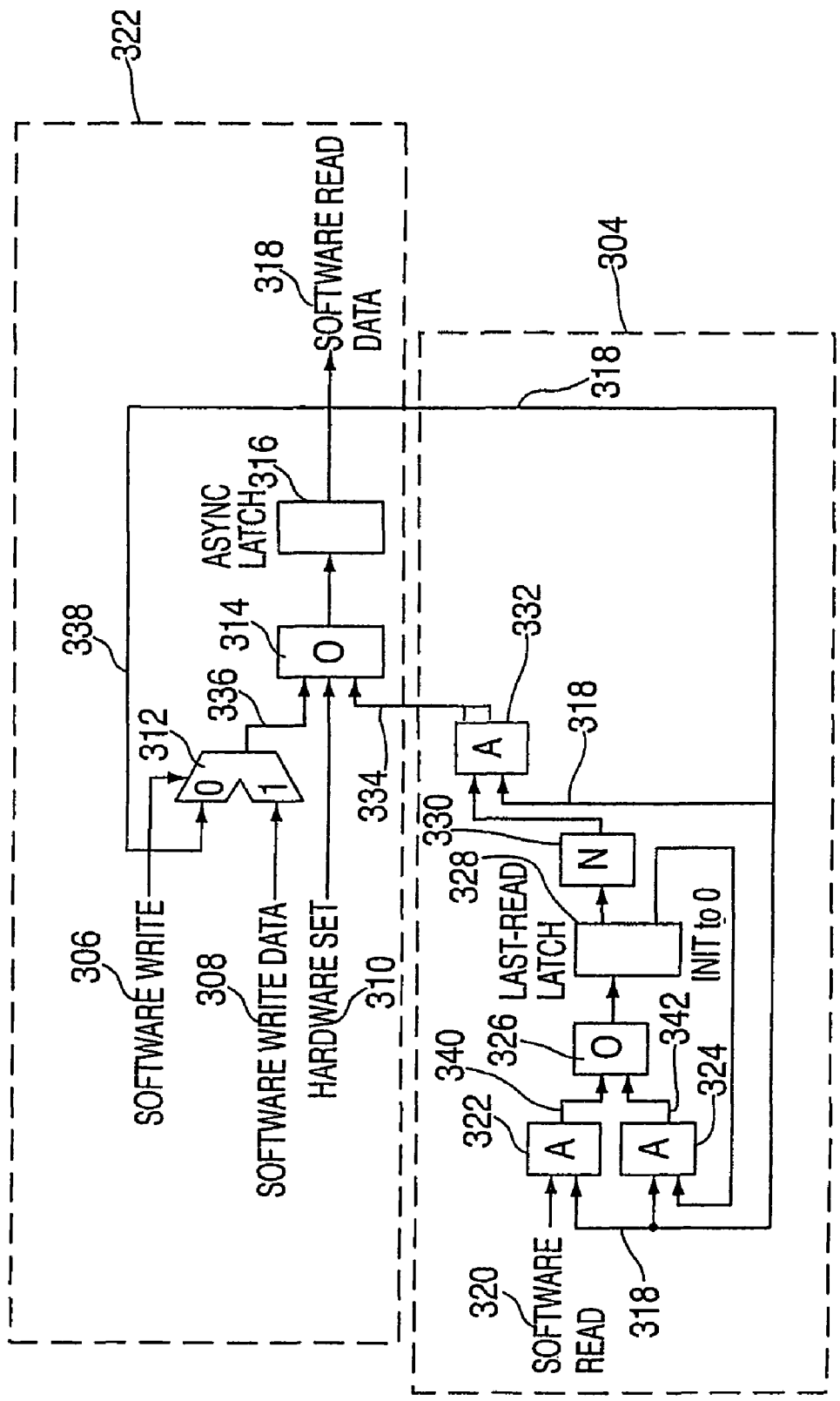
FIG. 3 is a block diagram of a system for a hardware set to be overridden by a software write in accordance with exemplary embodiments of the present invention.

FIG. 3 is a block diagram of exemplary circuitry for preventing a hardware set from being overridden by a software write, in accordance with exemplary embodiments of the present invention. Typical latch circuitry 302 within a register that has a hardware set function includes a hardware set path 310, a software write path 306, a hold path 338 and a software read data path 318. In addition, the latch circuitry 302 includes a multiplexor 312, an OR gate 314 and a latch 316 arranged as depicted in FIG. 3. Protection logic circuitry 304 ensures that a hardware set is not lost during a software write operation. The protection logic circuitry 304 includes an AND gate 322, another AND gate 324, an OR gate 326, a last-read latch 328, an inverter 330 and a further AND gate 332 arranged as shown in FIG. 3. The protection logic circuitry 304 remembers the value of the latch 316 at the time of the last software read in the last-read latch 328. When the last-read latch 328 is "0" and the current value of the latch 316 is "1", the protection logic drives a "1" on the protection logic output path 334 to prevent software from resetting the latch 316. The protection stays asserted until software again reads the latch 316 and sees that the value is now "1", at which time, the last-read latch 328 is set through path 340. The protection logic output path 334 is then de-asserted such that software writes to the latch 316 are possible through the protection logic output path 334. The last-read latch 328 stays asserted until the software writes a "0" to the latch 316, at which time the last-read latch 328 is reset through path 342.

The common scenario for which the protection logic circuitry 304 is useful is when the software is interested in accessing a generally accessible register 100 for the purpose of updating one or more fields, for example field/bit "w" as shown in FIG. 1. The software read-modify-write to obtain bit w actually accesses the entire register 100 including bit w, which may represent an asynchronously updateable field. Hardware may update bit w during the software read-modify-write operation and the value written by the software now has an invalid (stale) value for bit w. The protection logic circuitry 304 detects this and forces bit w to maintain its current value, overriding the software update. If the software requires that bit w be updated, it must re-read the register 100 to obtain the current value in bit w and repeat the process described in reference to FIG. 2.

Figure 4:
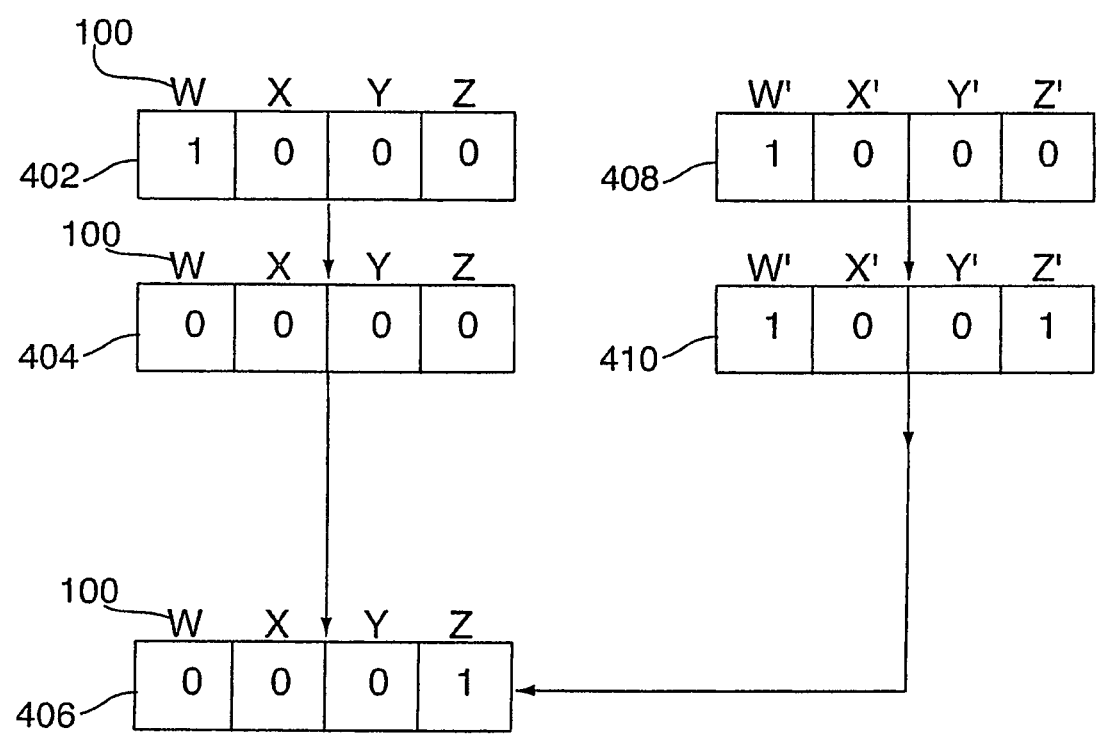
FIG. 4 is a block diagram of an asynchronous latch update process in a system where the hardware includes circuitry to reset a latch.

FIG. 4 is a block diagram of an asynchronous latch update process in a system where the hardware includes circuitry to reset a latch. FIG. 1 depicts the case where the hardware is resetting a bit in a register 100 at the same time that the software is performing a read-modify-write to the register 100. Box 402 represents the register 100 with bit w=1, bit x=0, bit y=0 and bit z=0. The software performs a read-modify-write operation to bit z. First, the software reads the register 100 into box 408 including the values bit w'=1, bit x'=0, bit y'=0 and bit z'=0. The software performs its processing and updates field z' resulting in the data values included in box 410. Box 410 includes the values bit w'=1, x'=0, y'=0 and z'=1. Before the software attempts to write the data back into the register 100, the hardware has performed a reset operation on bit w as shown in box 404. Box 404 depicts the values contained in the register 100 including bit w=0, bit x=0, bit y=0 and bit z=0. Now, if the software writes the contents of box 410 to the register 100, the update to bit w, performed by the hardware will be overwritten. This would result in the register 100 containing invalid data because the value of bit w read by the software is a stale value and does not contain the latest update made by the hardware. Exemplary embodiments of the present invention ensure that the hardware update to bit w is not overwritten by the value read by the software before the hardware update was performed (i.e., that box 406 includes both the hardware update to bit w and the software update to bit z). This results in valid data being contained in the register 100 as shown in box 406.

Figure 5:
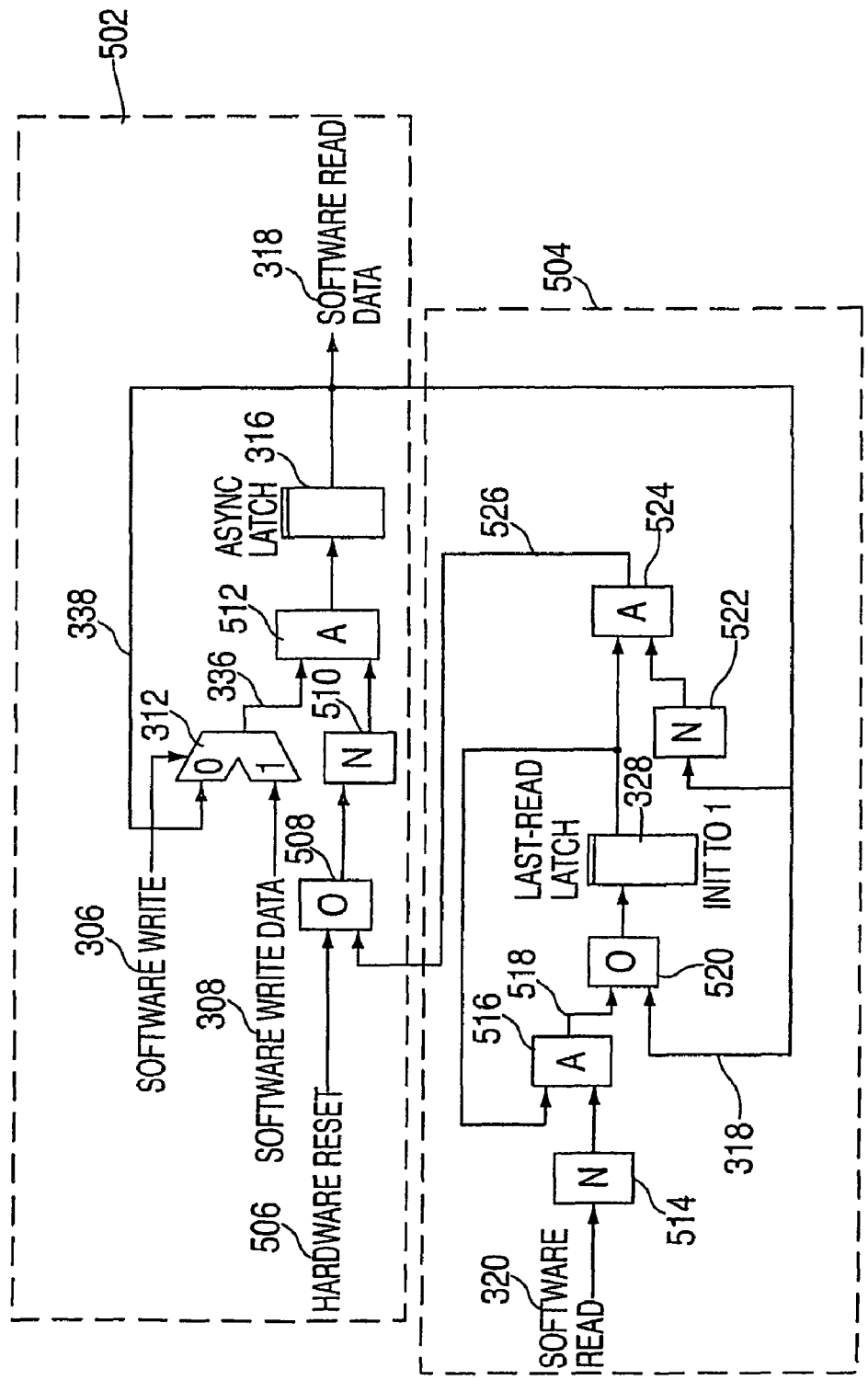
FIG. 5 is a block diagram of a system for preventing a hardware reset to be overridden by a software write in accordance with exemplary embodiments of the present invention.

FIG. 5 is a block diagram of an exemplary system for preventing a hardware reset to be overridden by a software write in accordance with exemplary embodiments of the present invention. Typical latch circuitry 502 within a register that includes a hardware reset function includes a hardware reset path 506, a software write path 306, a hold path 338 and a software read data path 318. In addition, the latch circuitry 502 includes a multiplexor 312, an OR gate 508, an inverter 510, an AND gate 512 and a latch 316 arranged as depicted in FIG. 5. Protection logic circuitry 504 ensures that a hardware reset is not lost during a software write operation. The protection logic circuitry 504 includes an inverter 514, an AND gate 516, an OR gate 520, a last-read latch 328, another inverter 522 and another AND gate 524 arranged as shown in FIG. 5. The protection logic circuitry 504 remembers the value of the latch 316 at the time of the last software read in the last-read latch 328. When the last-read latch 328 is "1" and the current value of the latch 316 is "0", the protection logic drives a "1" on the protection logic output path 526 to prevent software from setting the latch 316. The protection stays asserted until software again reads the latch 316 and sees that the value is now "0", at which time, the last-read latch 328 is updated through path 518. The protection logic output path 526 is then de-asserted such that software writes to the latch 316 are possible through the protection logic output path 526. The last-read latch 328 stays de-asserted until the software writes a "1" to the latch 316, at which time the last-read latch 328 is set through path 318.

In exemplary embodiments of the present invention, the hardware described above is a processor and the software is millicode that executes on the processor. For example, the processor may be a server and the software may be millicode that executes on the processor at a code layer underneath the operating system. In these exemplary embodiments, the generally-accessible registers as described previously are the architected and micro-architected registers of the processor. In addition, the asynchronously updateable register as described previously is a log-trace control register that generates asynchronous interrupt to the millicode.

Exemplary embodiments of the present invention allow standard read-modify-write operations to access asynchronously updateable registers while providing protection against the software instruction overwriting a value placed in the register by the hardware during a read-modify-write operation. Exemplary embodiments of the present invention include attaching protection logic circuitry to bits in a register that are known to be critical. Advantages to this approach are that bits that are known to be critical are protected by hardware and that the hardware protection is not affected by the addition of new functions and/or redefinitions.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A computer program product for controlling asynchronous updates to a register, the computer program product comprising:
    a storage medium readable by a processing circuit and storing instructions for execution by the processing circuit for performing a method comprising:
        processing a software read instruction for a bit within the register, the software read instruction a read portion of a read-modify-write instruction;
        storing the value of the bit read by the software read instruction in a last read field;
        receiving a software write request to the bit, the software write request a write portion of the read-modify-write instruction;
        comparing a current value of the bit to the last read field; and
        preventing processing of the software write request if the current value of the bit is not equal to the last read field.

* * * * *